(12) United States Patent
Saund et al.

(10) Patent No.: US 9,053,058 B2
(45) Date of Patent: Jun. 9, 2015

(54) QOS INBAND UPGRADE

(71) Applicant: Apple Inc., Cupertino, CA (US)

(72) Inventors: Gurjeet S. Saund, Saratoga, CA (US);
Deniz Balkan, Santa Clara, CA (US);
Kevin C. Wong, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 13/721,665

(22) Filed: Dec. 20, 2012

(65) Prior Publication Data

US 2014/0181824 A1    Jun. 26, 2014

(51) Int. Cl.
*H04L 12/54* (2013.01)
*G06F 13/14* (2006.01)

(52) U.S. Cl.
CPC ...................................... *G06F 13/14* (2013.01)

(58) Field of Classification Search
None
See application file for complete search history.

(56) References Cited

U.S. PATENT DOCUMENTS

| | | | |
|---|---|---|---|
| 3,311,885 A | 3/1967 | Propster, Jr. | |
| 5,581,703 A | 12/1996 | Baugher et al. | |
| 5,649,110 A | 7/1997 | Ben-nun et al. | |
| 5,742,772 A | 4/1998 | Sreenan | |
| 6,047,051 A | 4/2000 | Ginzboorg et al. | |
| 6,092,095 A | 7/2000 | Maytal | |
| 6,184,906 B1 | 2/2001 | Wang et al. | |
| 6,295,281 B1 | 9/2001 | Itkowsky et al. | |
| 6,324,616 B2 | 11/2001 | Chrysos et al. | |
| 6,425,060 B1 | 7/2002 | Mounes-Toussi et al. | |
| 6,597,691 B1 | 7/2003 | Anderson et al. | |
| 6,628,609 B2 | 9/2003 | Chapman et al. | |
| 6,738,881 B1 | 5/2004 | Ollivier et al. | |
| 6,754,179 B1 | 6/2004 | Lin | |
| 6,784,890 B1 | 8/2004 | Bergeson et al. | |
| 6,804,757 B2 | 10/2004 | Weber | |
| 6,859,438 B2 | 2/2005 | Haddock et al. | |
| 6,947,970 B2 | 9/2005 | Berry | |
| 6,965,563 B1 | 11/2005 | Hospodor et al. | |
| 7,017,020 B2 | 3/2006 | Herbst et al. | |
| 7,047,366 B1 | 5/2006 | Ezra | |
| 7,145,904 B2 | 12/2006 | Zhao et al. | |
| 7,146,468 B2 | 12/2006 | Hardage, Jr. | |

(Continued)

FOREIGN PATENT DOCUMENTS

CN           101419579         4/2009

OTHER PUBLICATIONS

European Search Report for European Application No. 11180199.9 dated Dec. 29, 2011, 8 pages.

(Continued)

*Primary Examiner* — Duc C Ho

(74) *Attorney, Agent, or Firm* — Rory D. Rankin; Meyertons, Hood, Kivlin, Kowert & Goetzel, P.C.

(57) ABSTRACT

Systems and methods for upgrading QoS levels of older transactions based on the presence of higher level QoS transactions in a given queue. A counter may be maintained to track the number of transactions in a queue that are assigned a corresponding QoS level. Each separate QoS level can have a corresponding counter. When a transaction is received by the queue, the counter corresponding to the QoS level of the transaction is incremented. When a transaction leaves the queue, the transaction is upgraded to the highest QoS level with a non-zero counter. Also, when the transaction leaves the queue, the counter corresponding to the original QoS level of the transaction is decremented.

24 Claims, 9 Drawing Sheets

(56) References Cited

U.S. PATENT DOCUMENTS

| | | | |
|---|---|---|---|
| 7,155,554 B2 | 12/2006 | Vinogradov et al. |
| 7,161,904 B2 | 1/2007 | Hussain et al. |
| 7,274,700 B2 | 9/2007 | Jin et al. |
| 7,277,975 B2 | 10/2007 | Vinogradov et al. |
| 7,293,136 B1 | 11/2007 | More et al. |
| 7,346,063 B1 | 3/2008 | Herbst |
| 7,350,028 B2 | 3/2008 | Cameron et al. |
| 7,353,310 B2 | 4/2008 | Roever |
| 7,469,309 B1 | 12/2008 | Duncan et al. |
| 7,480,304 B2 | 1/2009 | Yeh et al. |
| 7,496,777 B2 | 2/2009 | Kapil |
| 7,535,898 B2 | 5/2009 | Akella et al. |
| 7,539,143 B2 | 5/2009 | Moores et al. |
| 7,548,545 B1 | 6/2009 | Wittenschlaeger |
| 7,562,213 B1 | 7/2009 | Timms |
| 7,570,651 B2 | 8/2009 | Haghighi |
| 7,593,329 B2 | 9/2009 | Kwan et al. |
| 7,596,139 B2 | 9/2009 | Patel et al. |
| 7,621,162 B2 | 11/2009 | Bartky |
| 7,647,444 B2 | 1/2010 | Dignum et al. |
| 7,653,069 B2 | 1/2010 | Lakshmanamurthy et al. |
| 7,660,931 B2 | 2/2010 | Hayter et al. |
| 7,675,925 B2 | 3/2010 | Jones |
| 7,675,926 B2 | 3/2010 | Olsen et al. |
| 7,715,377 B2 | 5/2010 | Mick et al. |
| 7,716,395 B2 | 5/2010 | Sethi |
| 7,725,657 B2 | 5/2010 | Hasenplaugh et al. |
| 7,801,045 B2 | 9/2010 | Mathews et al. |
| 7,948,883 B1 | 5/2011 | Croft, Jr. et al. |
| 7,979,552 B1 | 7/2011 | Saraiya et al. |
| 7,990,858 B2 | 8/2011 | Iny |
| 8,074,028 B2 | 12/2011 | Plamondon |
| 8,077,608 B1 | 12/2011 | Arad et al. |
| 8,218,538 B1 | 7/2012 | Chidambaram et al. |
| 8,314,807 B2 | 11/2012 | Biswas et al. |
| 8,493,863 B2 | 7/2013 | Saund et al. |
| 8,607,022 B2 | 12/2013 | Balkan et al. |
| 8,631,213 B2 | 1/2014 | Biswas et al. |
| 8,649,286 B2 | 2/2014 | Saund et al. |
| 2002/0095498 A1 | 7/2002 | Chanda et al. |
| 2002/0181395 A1 | 12/2002 | Foster et al. |
| 2003/0093633 A1 | 5/2003 | Thiesfeld et al. |
| 2003/0202517 A1 | 10/2003 | Kobayakawa et al. |
| 2004/0017820 A1 | 1/2004 | Garinger et al. |
| 2004/0081093 A1 | 4/2004 | Haddock et al. |
| 2004/0141516 A1 | 7/2004 | Lee |
| 2004/0210695 A1 | 10/2004 | Weber et al. |
| 2004/0246891 A1* | 12/2004 | Kay et al. ............ 370/215 |
| 2005/0052992 A1 | 3/2005 | Cloonan et al. |
| 2005/0060456 A1 | 3/2005 | Shrader et al. |
| 2005/0081009 A1 | 4/2005 | Williams et al. |
| 2005/0141427 A1 | 6/2005 | Bartky |
| 2005/0246441 A1 | 11/2005 | Chandrasekaran et al. |
| 2005/0249220 A1 | 11/2005 | Olsen et al. |
| 2006/0013133 A1 | 1/2006 | Peng et al. |
| 2006/0029089 A1* | 2/2006 | Zellner et al. ............ 370/412 |
| 2006/0064494 A1 | 3/2006 | Fukui |
| 2006/0092944 A1 | 5/2006 | Wingard et al. |
| 2006/0104298 A1 | 5/2006 | McAlpine et al. |
| 2006/0140119 A1 | 6/2006 | Yeh et al. |
| 2007/0011396 A1 | 1/2007 | Singh et al. |
| 2007/0109968 A1 | 5/2007 | Hussain et al. |
| 2007/0294418 A1 | 12/2007 | Wils et al. |
| 2008/0069125 A1 | 3/2008 | Reed et al. |
| 2008/0159129 A1 | 7/2008 | Songhurst et al. |
| 2008/0181234 A1 | 7/2008 | Arndt et al. |
| 2008/0192764 A1* | 8/2008 | Arefi et al. ............ 370/412 |
| 2008/0215786 A1 | 9/2008 | Goossens et al. |
| 2008/0244135 A1 | 10/2008 | Akesson et al. |
| 2008/0298397 A1 | 12/2008 | Kwan et al. |
| 2008/0316921 A1 | 12/2008 | Mathews et al. |
| 2008/0320254 A1 | 12/2008 | Wingard et al. |
| 2009/0010152 A1 | 1/2009 | Ofek et al. |
| 2009/0043920 A1 | 2/2009 | Kuris et al. |
| 2009/0070771 A1 | 3/2009 | Yuyitung et al. |
| 2009/0147731 A1 | 6/2009 | Chion et al. |
| 2009/0172318 A1 | 7/2009 | Sugai et al. |
| 2009/0207866 A1 | 8/2009 | Cholas et al. |
| 2009/0228535 A1 | 9/2009 | Rathi et al. |
| 2009/0279559 A1 | 11/2009 | Wong et al. |
| 2009/0287865 A1 | 11/2009 | Aldworth et al. |
| 2009/0323540 A1 | 12/2009 | Goossens et al. |
| 2010/0049913 A1 | 2/2010 | Marcu et al. |
| 2010/0278195 A1 | 11/2010 | Wagh et al. |
| 2010/0318713 A1 | 12/2010 | Deshpande |
| 2011/0110237 A1 | 5/2011 | Wong et al. |
| 2011/0173393 A1 | 7/2011 | Isono |
| 2011/0197038 A1 | 8/2011 | Henriksson et al. |
| 2011/0276972 A1 | 11/2011 | Chung et al. |
| 2011/0302345 A1 | 12/2011 | Boucard et al. |
| 2012/0063313 A1 | 3/2012 | Zhou et al. |
| 2012/0072678 A1 | 3/2012 | Biswas et al. |
| 2012/0124591 A1 | 5/2012 | Cadambi et al. |
| 2012/0185062 A1 | 7/2012 | Saund et al. |
| 2012/0265937 A1 | 10/2012 | Resch et al. |
| 2013/0054766 A1* | 2/2013 | Aaron et al. ............ 709/221 |
| 2013/0132682 A1 | 5/2013 | Kassoff |
| 2013/0159633 A1 | 6/2013 | Lilly |

OTHER PUBLICATIONS

International Search Report and Written Opinion in PCT/US11/49940; mailed Dec. 22, 2011; 11 pages.

Office Action from U.S. Appl. No. 12/883,848, dated Mar. 12, 2012, Apple Inc., 18 pages.

Action from Netherlands Application No. NL2007411, dated Feb. 29, 2012, Apple Inc., 7 pages.

U.S. Appl. No. 12/883,848, filed Sep. 16, 2010.

U.S. Appl. No. 12/883,878, filed Sep. 16, 2010.

U.S. Appl. No. 12/883,888, filed Sep. 16, 2010.

Office Action from Japanese Patent Application No. 2011-221349, mailed Jun. 26, 2013, (English Translation and Japanese Versions), pp. 1-7.

Non-Final Office Action in related U.S. Appl. No. 12/883,888, dated Mar. 20, 2013, pp. 1-14.

Office Action from U.S. Appl. No. 12/883,864, dated Feb. 22, 2012, Apple Inc., 16 pages.

ARM White Paper, "The ARM Cortex-A9 Processors," Document Revision 2.0, Sep. 2009, 11 pages.

ARM, "Cortex-A9 MPCore, Revision: r2p2, Technical Manual," Copyright 2008-2010, 168 pages.

International Search Report & Written Opinion from PCT/US2012/02057 dated Mar. 19, 2012.

U.S. Appl. No. 13/008,171 entitled "Fabric Limiter Circuits" filed Jan. 18, 2011.

U.S. Appl. No. 13/008,156 entitled "Write Traffic Shaper Circuits" filed Jan. 18, 2011.

U.S. Appl. No. 13/008,184 entitled "Hierarchical Fabric Control Circuits" filed Jan. 18, 2011.

Search report in application No. EP 12150817.0, mailed Mar. 2, 2012, pp. 1-4.

Bolotin et al: "QNoC: QoS architecture and design process for Network on Chip", Journal of Systems Architecture, Elsevier BV, N L, vol. 58, Feb. 28, 2004, pp. 1-18.

Notice of Allowance and Fees Due in related U.S. Appl. No. 13/008,184, mailed Jun. 10, 2013, pp. 1-9.

Non-Final Office Action in related U.S. Appl. No. 13/008,171, mailed May 9, 2013, pp. 1-16.

Notice of Preliminary Rejection and translation thereof in KR Application No. 10-2012-5231, Jan. 29, 2013, pp. 1-14.

Non-Final Office Action in U.S. Appl. No. 13/008,184, Feb. 25, 2013, pp. 1-15.

Nesbit, Kyle J. et al., "Fair Queuing Memory Systems", In Proc. of the 39th Intl. Symp. on Microarchitecture, Dec. 9-13, 2006, pp. 1-12.

Iyer, Ravi et al., "QoS Policies and Architecture for Cache/Memory in CMP Platforms", in Proceedings of the 2007 ACM SIGMETRICS International Conference on Measurement and Modeling of Computer Systems, Jun. 12-16, 2007, pp. 1-12.

\* cited by examiner

Table 120

| Original QoS | Effective QoS=G | Effective QoS=Y | Effective QoS=R |
|---|---|---|---|
| G | G | PushY | PushR (from G) |
| Y | N/A | Y | PushR (from Y) |
| PushY | N/A | PushY | PushR (from G) |
| R | N/A | N/A | R |
| PushR (from G) | N/A | N/A | PushR (from G) |
| PushR (from Y) | N/A | N/A | PushR (from Y) |

FIG. 6

QOS INBAND UPGRADE

BACKGROUND

1. Field of the Invention

The present invention relates generally to the field of computer systems, and in particular to methods and mechanisms for upgrading quality-of-service (QoS) levels of memory transactions.

2. Description of the Related Art

To prioritize some transactions over other transactions in the movement through a system on chip (SoC) fabric, a quality-of-service (QoS) mechanism may be implemented such that an agent generating a transaction may also provide information representing the QoS associated with that transaction. In a typical scenario, arbiters and queues in the path of a memory request or transaction containing QoS information should be capable of processing that information or forwarding the information to a subsequent circuit which is then capable of processing it. In addition, logic implemented in a SoC should be able to efficiently upgrade or push older transactions when younger transactions with a higher QoS level are waiting behind the older transactions. In some cases, transactions may be stored in a queue, and logic may be utilized to search the queue's existing transactions when a new transaction is received by the queue. However, repeating these searches every time a new transaction is received by the queue is inefficient in terms of power consumption.

SUMMARY

Systems and methods for upgrading the QoS level of transactions in a queue are contemplated.

In one embodiment, a system on chip (SoC) may be configured to process transactions according to the QoS level of the transaction. The SoC may include one or more queues throughout the bus fabric of the SoC, and these queues may store a plurality of transactions that are traversing the SoC between various agents. Each queue may be configured to upgrade older transactions based on the presence of younger transactions with a higher QoS level in the queue.

In one embodiment, a transaction being read out of the queue may be upgraded by the presence of a younger transaction with a higher QoS level in the queue. Each transaction may include an assigned QoS level. As transactions are received by the queue, a counter may be incremented based on the QoS level of the transaction. There may be a counter for each possible QoS level. Then, when a transaction is being read out of the queue, the transaction may be upgraded to the highest QoS level with a non-zero counter value. Also, when the transaction is read out of the queue, the counter corresponding to the original QoS level of the transaction may be decremented. This mechanism allows the queue to avoid having to perform power-intensive searches for every new transaction that enters the queue.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6 is a table showing how to escalate an original QoS level of a transaction in accordance with one embodiment.

DETAILED DESCRIPTION OF EMBODIMENTS

Figure 1:
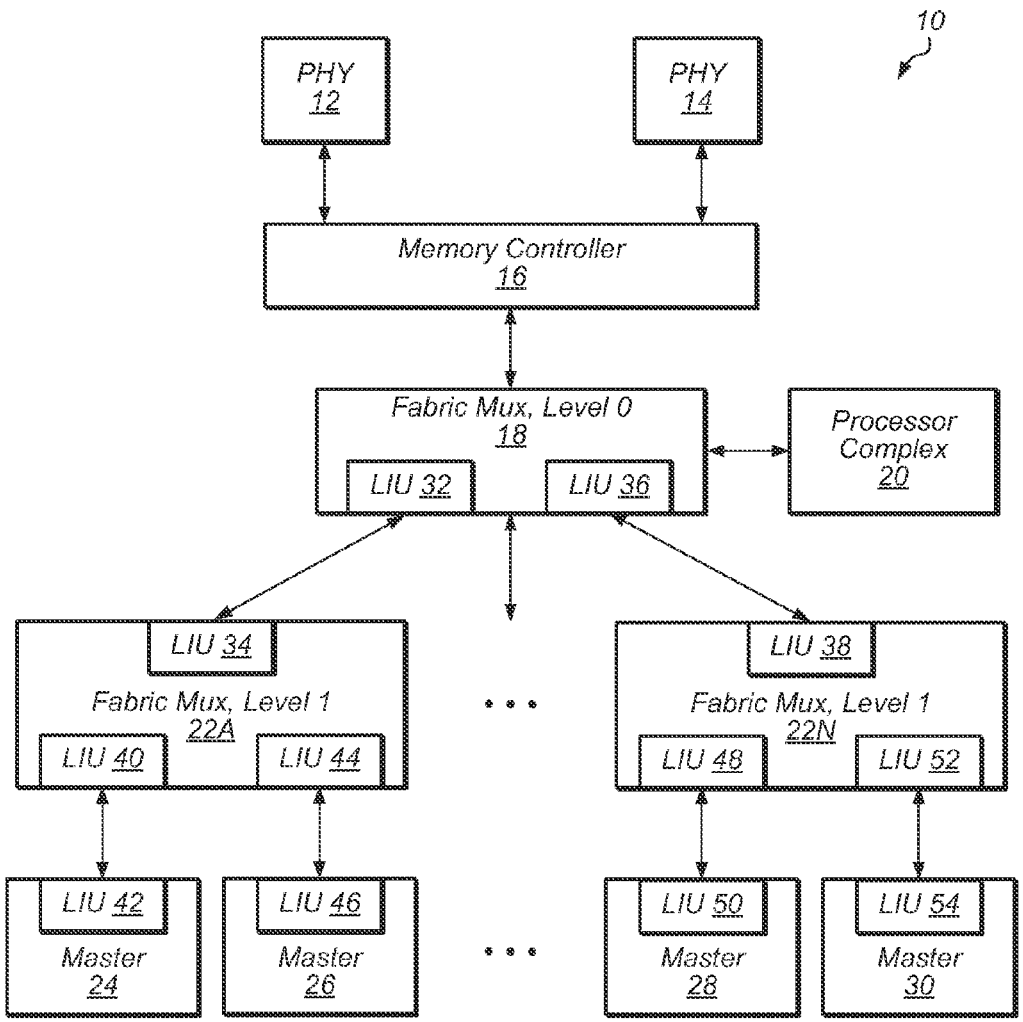
FIG. 1 is a block diagram illustrating one embodiment of a portion of an integrated circuit (IC).

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a processor unit . . . . " Such a claim does not foreclose the apparatus from including additional components (e.g., a memory device, input device, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes processor complex 20, level 0 fabric mux 18, level 1 fabric muxes 22A-N, masters 24, 26, 28, and 30, memory controller 16, and memory physical interface circuits (PHYs) 12 and 14. It is noted that IC 10 may also include many other components not shown in FIG. 1. In various embodiments, IC 10 may also be referred to as a system on chip (SoC), an application specific integrated circuit (ASIC), or an apparatus. Clock sources, such as phase lock loops (PLLs), and power sources are not shown for ease of illustration. Components shown within IC 10 may be coupled to each other using any suitable bus and/or interface mechanism.

Processor complex 20 may include any number of central processing units (CPUs) (not shown), a supporting cache hierarchy including a level two (L2) cache (not shown), and a variety of other components and logic. The CPU(s) of processor complex 20 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, level 0 fabric mux 18 and level 1 fabric muxes 22A-N may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

As shown in FIG. 1, communication between many of the components of IC 10 may be facilitated by link interface units (LIUs). LIUs may be interspersed throughout the fabric and logic of IC 10 in various locations. Each LIU may provide a point-to-point communications link between two agents in IC 10. The LIU may provide buffering and may manage the credit-based flow control mechanism for subchannels of traffic between the various agents of IC 10. As shown in FIG. 1, IC 10 may include the following LIU pairs, LIUs 32 and 34, 36 and 38, 40 and 42, 44 and 46, 48 and 50, and 52 and 54. In other embodiments, LIUs may be located in other components and/or one or more of the LIU pairs shown in FIG. 1 may be omitted. In one embodiment, the various LIUs of IC 10 may be identical to each other. In another embodiment, some of the LIUs within IC 10 may differ from other LIUs. For example, the size of buffers and the control logic within a LIU may be configured differently from other LIUs.

In various embodiments, IC 10 may also include circuitry in the fabric to ensure coherence among different masters and other I/O devices. This circuitry may include cache coherency logic employing a cache coherency protocol to ensure data accessed by each master is kept up to date. An example of a cache coherency protocol includes the MOESI protocol with the Modified (M), Owned (O), Exclusive (E), Shared (S), and Invalid (I) states.

Masters 24-30 are representative of any number and type of components which may be coupled to the fabric of IC 10. For example, masters 24-30 may include one or more cameras, flash controllers, display controllers, media controllers, graphics units, and/or other devices. Masters 24-30 are also representative of any number of I/O interfaces or devices and may provide interfaces to any type of peripheral device implementing any hardware functionality included in the system. For example, any of the masters 24-30 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
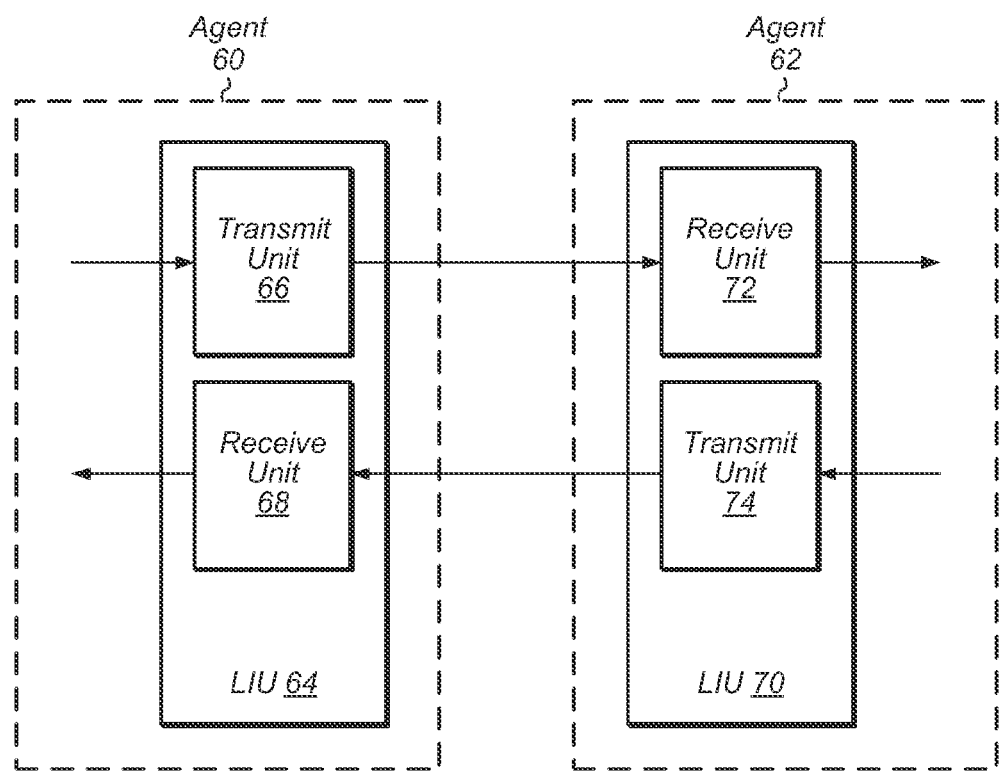
FIG. 2 is a block diagram of one embodiment of a pair of link interface units (LIUs).

Turning now to FIG. 2, a block diagram of one embodiment of a pair of link interface units (LIUs) is shown. Agents 60 and 62 may be connected together and may communicate via LIU 64 and LIU 70. Each LIU may include a receive unit and a transmit unit. For example, LIU 64 may include transmit unit 66 and receive unit 68 and LIU 70 may include transmit unit 74 and receive unit 72. The receive units 68 and 72 may include buffering (not shown) and QoS upgrade logic (not shown) for upgrading the QoS levels of transactions that are being pushed by younger transactions with a higher QoS level.

The transmit units 66 and 74 may receive transactions from agents 60 and 62, respectively, and then transmit these transactions on the fabric link to the corresponding receive unit. Receive units 68 and 72 may receive transactions from the fabric link and then transmit these transactions to their host agent. The transmit units 66 and 74 may receive credits from receive units 72 and 74, respectively, and then the buffer management may be managed by receive units 72 and 74. The transmit units 66 and 74 may provide credit availability to the agents and the agents may arbitrate between the different virtual channels (VCs) accordingly.

Figure 3:
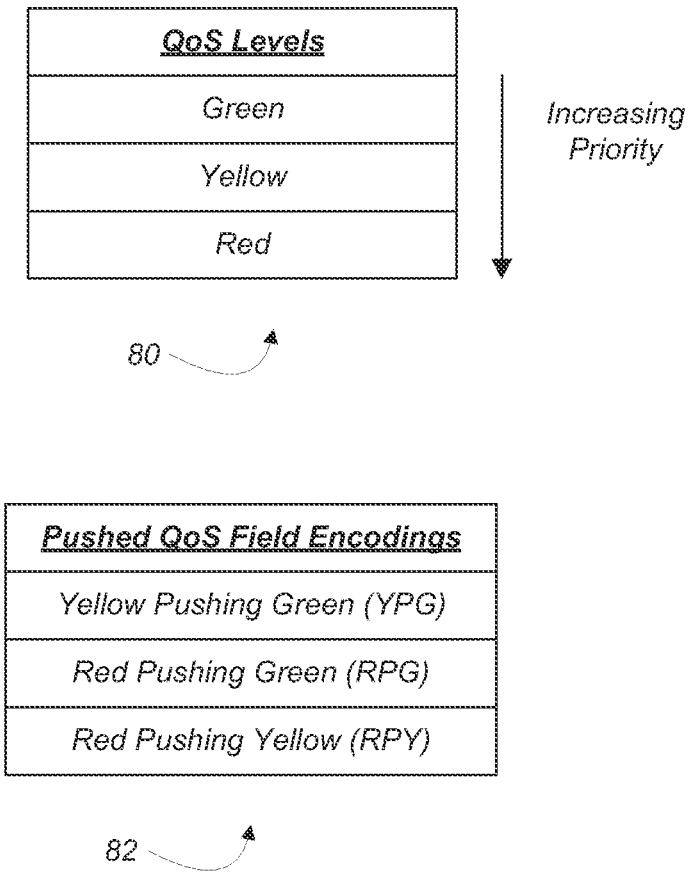
FIG. 3 illustrates a pair of tables of QoS levels and pushed QoS field encodings.

Referring now to FIG. 3, a pair of tables 80 and 82 are shown illustrating a definition of a set of original QoS levels and a set of pushed QoS field encodings, respectively, for one embodiment. Other embodiments may include additional or substitute levels, and other embodiments may include additional levels in combination with a subset of the illustrated levels. As illustrated by the arrow pointing downward next to the table 80 in FIG. 2, the table 80 illustrates the QoS levels within a set in increasing priority. That is, the green QoS level is the lowest priority QoS level, the yellow QoS level is the medium priority QoS level, and the red QoS level is the highest priority QoS level. A source may assign a QoS level to a given transaction based on the priority of the given transaction.

Generally speaking, a transaction may comprise a memory request, and the term "memory request" is not limited to requests that are ultimately responded to by memory, but can also include requests that are satisfied by a cache. It is noted that the terms "memory request", "transaction", and "memory operation" may be used interchangeably throughout this disclosure.

The green, yellow, and red QoS levels may reflect relative levels of urgency from a source. That is, as the amount of time before data is needed by the source to prevent erroneous operation decreases, the QoS level assigned to each transaction increases to indicate the higher urgency. By treating transactions having higher urgency with higher priority, data may be returned to the source more quickly and may thus aid the correct operation of the source.

For example, a display pipe may initiate the reading of frame data from memory for the next frame to be displayed in the vertical blanking interval for the display. The frame is not actually displayed until the end of the vertical blanking interval, and thus the display pipe may use the green level during this time period. As the frame begins to be displayed (i.e. the display controller begins reading frame pixels from the display pipe output), the display pipe may raise the QoS level of frame data read operations to the memory to the yellow level. For example, if the amount of frame data that is read ahead of the current pixel being displayed reduces below a first threshold, the level may be raised to yellow. At a second threshold (lower than the first threshold), the display pipe may raise the QoS level of memory operations to red.

Transactions may be escalated from a low QoS level to a high QoS level based on a variety of criteria or triggers. When a transaction with an original low QoS level is escalated to a higher QoS level, the transaction may be assigned one of the QoS field encodings shown in table 82. For example, a transaction may be originally assigned a green QoS level, and this transaction may be pushed to a yellow QoS level somewhere along the path to its destination. Therefore, this transaction may be assigned a yellow pushing green (YPG) QoS field encoding. Similarly, if a transaction with an original QoS level of green is pushed to a red QoS level, this transaction may be assigned a red pushing green (RPG) QoS field encoding. Still further, if a transaction with an original QoS level of yellow is pushed to a red QoS level, this transaction may be assigned a red pushing yellow (RPY) QoS field encoding. In one embodiment, various arbiters within the bus fabric of the SoC may treat RPG and RPY transactions as the equivalent of red transactions. Also, arbiters may treat YPG transactions as the equivalent of yellow transactions.

It will be understood that the QoS levels shown in tables 80 and 82 of FIG. 3 are merely illustrative and should not be construed as implying any limitations upon the scope of the methods and mechanisms described herein. While the rest of this disclosure will be described in terms of transactions being assigned QoS levels from the tables 80 and 82, it is to be understood that other QoS schemes may be employed in other embodiments with more or fewer than three different QoS levels. Furthermore, other embodiments may represent the different QoS levels with designators other than colors.

Figure 4:
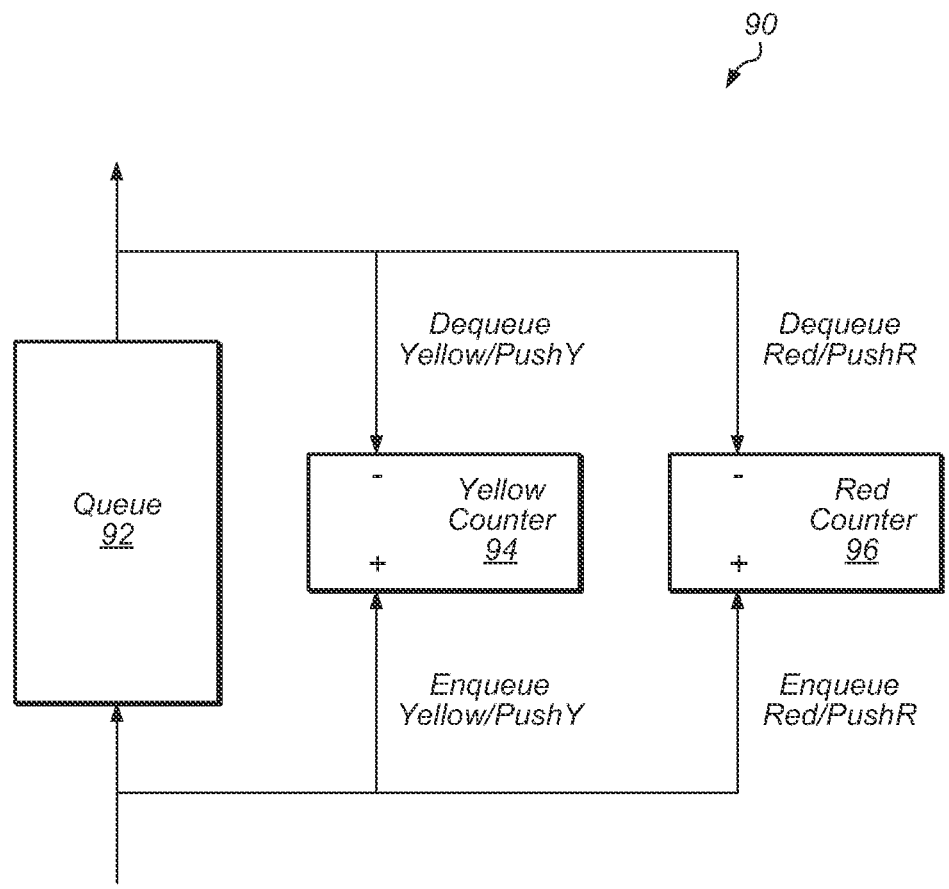
FIG. 4 is a block diagram illustrating one embodiment of a portion of a receive unit within a link interface unit.

Turning now to FIG. 4, a block diagram illustrating one embodiment of a portion of a receive unit within a link interface unit is shown. Receive unit 90 includes queue 92 and transaction counting logic implemented with counters 94 and 96. Receive unit 90 may also include other logic not shown in FIG. 4 for ease of illustration. Queue 92 is representative of any size of queue, with the capacity for storing any number of transactions. Yellow counter 94 may be configured to track the number of transactions in queue 92 which have a QoS level of yellow. The QoS level of yellow could be an original level of yellow or a pushed level of yellow. Red counter 96 may be configured to track the number of transactions in queue 92 which have a QoS level of red. The QoS level of red could be an original level of red or a pushed level of red.

Yellow counter 94 may be incremented whenever a transaction with a QoS attribute of yellow is received and stored in queue 92. Similarly, red counter 96 may be incremented whenever a transaction with a QoS attribute of red is received and stored in queue 92. Also, when a yellow QoS level transaction exits queue 92, yellow counter 94 may decrement. Likewise, when a red QoS level transaction exits queue 92, red counter 96 may decrement. In this way, yellow counter 94 and red counter 96 may stay up to date with an accurate count of the number of yellow transactions and red transactions, respectively, currently stored in queue 92. It is noted that yellow counter 94 will not be decremented if a green transaction is upgraded to yellow when leaving queue 92. Only transactions that had a yellow QoS level when they entered queue 92 will cause yellow counter 94 to be decremented when they leave queue 92. This property may also apply to red counter 96.

Figure 5:
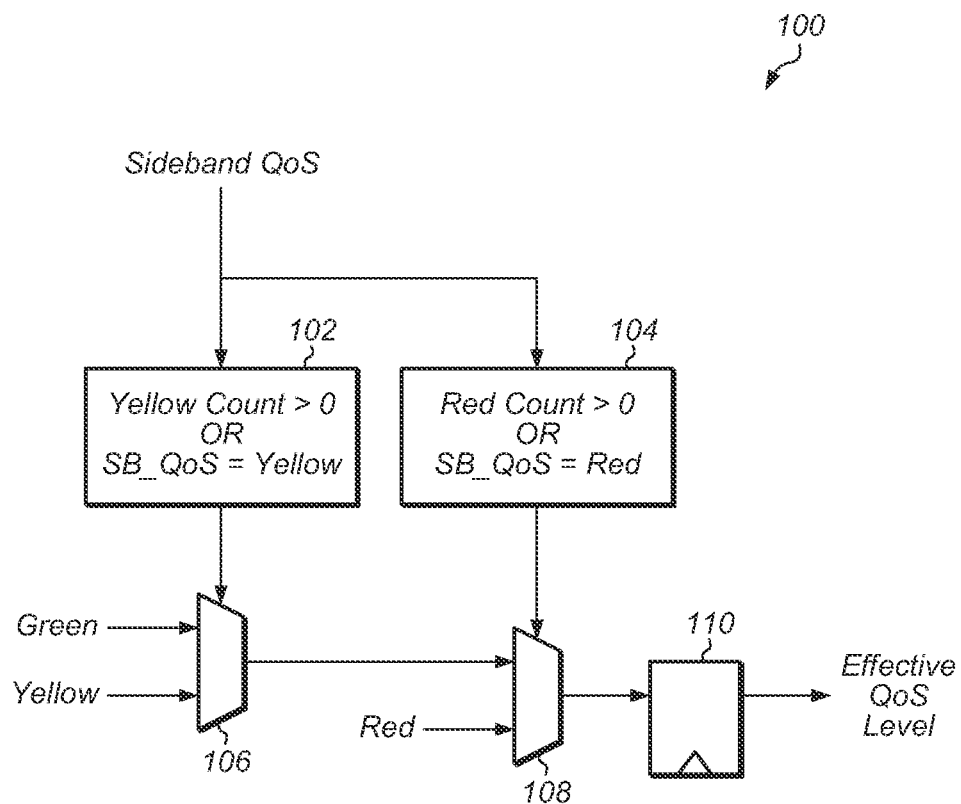
FIG. 5 is another block diagram illustrating one embodiment of a portion of a receive unit within a link interface unit.

Referring now to FIG. 5, another block diagram of one embodiment of a portion of a receive unit of a link interface unit is shown. The receive unit 100 may include control logic for generating an effective QoS level for transactions that are being read out of a queue (not shown). In one embodiment, a sideband QoS signal may also be received by receive unit 100. However, in some embodiments, the sideband QoS signal may not be included. In one embodiment, each of the different color QoS levels may be represented by a unique encoding value, and the colors shown in FIG. 5 may represent their corresponding encoding value.

Logic unit 102 may determine if the yellow QoS counter (not shown) is non-zero or if the sideband QoS signal (SB_QoS) is set to yellow. If either of these cases is true, then logic unit 102 may generate a select signal for mux 106 to select the yellow QoS level. If both cases are false, then logic unit 102 may generate a select signal for mux 106 to select the green QoS level. Similarly, logic unit 104 may determine if the red QoS counter (not shown) is non-zero or if sideband QoS signal is set to red. If either of these cases is true, then logic unit 104 may generate a select signal for mux 108 to select the red QoS level. If both cases are false, then logic unit 104 may generate a select signal for mux 108 to select the QoS level output from mux 106. In one embodiment, the output of mux 108 may be coupled to register 110, and then the output of register 110 may be the effective QoS level of a transaction being read out of the queue. The effective QoS level may be coupled to an upgrade mechanism (not shown) for assigning the effective QoS level to a transaction leaving the queue. For other embodiments, with other numbers of QoS levels besides three, receive unit 100 may include additional logic units to determine if the other counters corresponding to these QoS levels are non-zero or if the sideband QoS signal is set to any of these other QoS levels.

When a transaction is read out of the queue, then the control logic shown in FIG. 5 may be activated to determine whether to upgrade the QoS level of the selected transaction. It is noted that the control logic shown in FIG. 5 is only one possible implementation of determining whether and how to upgrade the QoS level of a given transaction. In other embodiments, the logic may differ from that shown in FIG. 5. For example, in another embodiment, the sideband signal, the status of all upper level QoS level counters, and the current QoS level of the selected transaction may be inputs to a lookup table. The lookup table may generate an effective QoS level output which is equivalent to the output generated by the logic block diagram shown in FIG. 5. Also, in some embodiments, the logic shown in FIG. 5 may be implemented in software. Generally speaking, any combination of hardware and/or software may be utilized to implement a QoS level upgrade determination mechanism.

Turning now to FIG. 6, one embodiment of a table showing how to escalate an original QoS level of a transaction based on the calculated effective QoS level is shown. The left-most column of table 120, with the heading of "Original QoS", represents the QoS level of a given transaction when the given transaction first entered the queue. This may differ from the actual source QoS level that was assigned to the transaction by the requesting agent responsible for generating the transaction. For example, in one scenario, a given transaction may have a source QoS level of green assigned by its requesting agent, but the given transaction may be pushed to yellow at some point in the path being traversed to the transaction's destination. After being pushed to a QoS level of yellow, if the given transaction is received and stored in a queue, the given transaction will be considered to have a QoS level of Push Yellow (PushY) rather than the original QoS level of green.

The three right-most columns designate the type of QoS level escalation that may be performed based on the status of the upper-level QoS level counters and sideband signal. The effective QoS level is equal to green (G) if all of the upper-level QoS level counters are zero and the sideband signal is not asserted. The effective QoS level is equal to yellow (Y) if the red QoS level counter is zero and if either (1) the yellow QoS level counter is non-zero or (2) the sideband signal is set to yellow. The effective QoS level is equal to red (R) if the red QoS level counter is non-zero or if the sideband signal is set to red.

Figure 7:
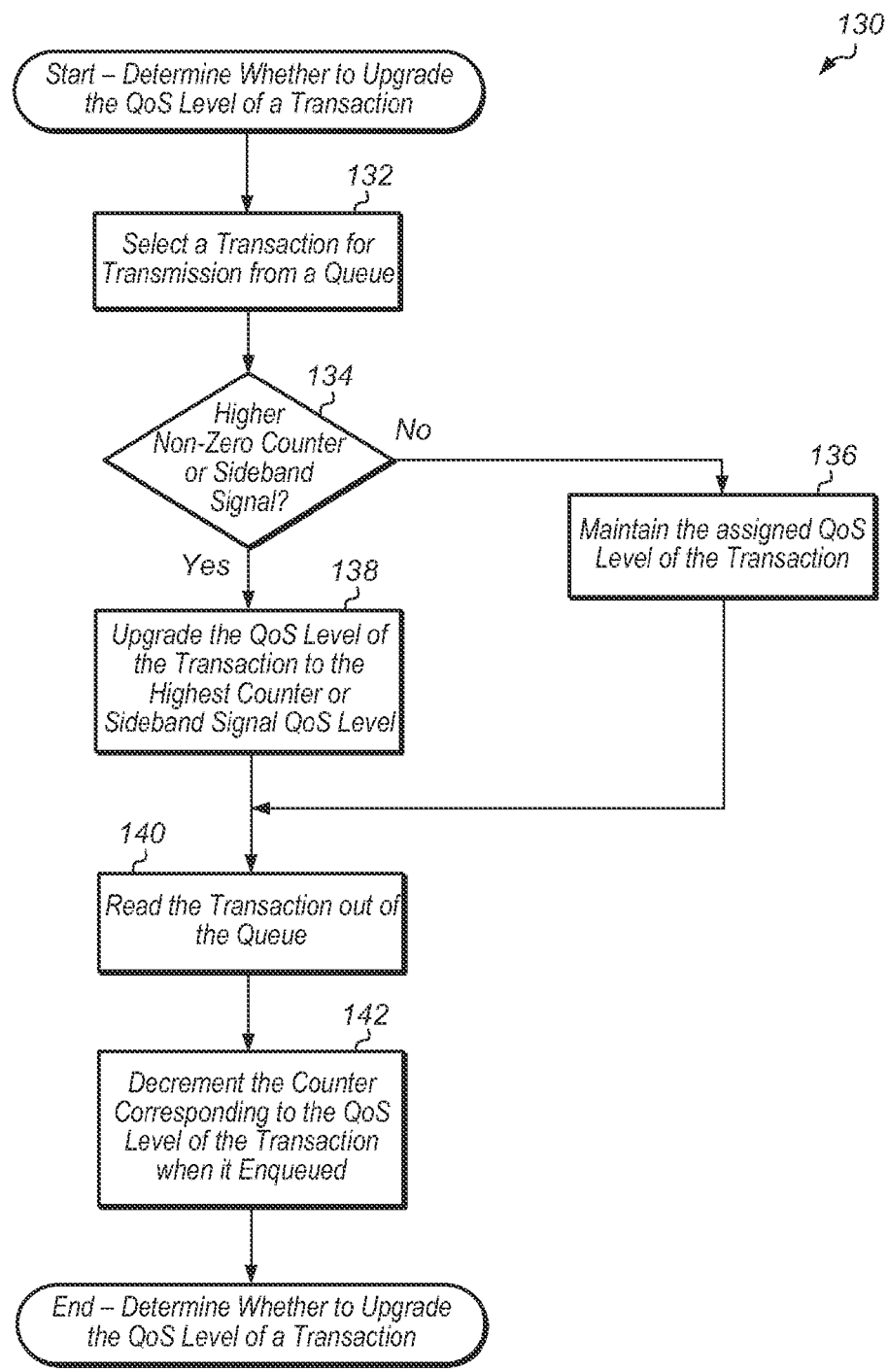
FIG. 7 is a generalized flow diagram illustrating one embodiment of a method for determining whether to upgrade the QoS level of a transaction.

Referring now to FIG. 7, one embodiment of a method 130 for determining whether to upgrade the QoS level of a transaction is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a transaction may be selected for transmission from a queue (block 132). The queue may have any number of entries for storing any number of transactions. Each entry may store the transaction and the assigned QoS level of the transaction. Next, control logic may check the status of the counters for all QoS levels that are higher than the QoS level of the selected transaction, and the control logic may also check the status of the sideband signal (conditional block 134).

If there are no non-zero counters for QoS levels above the assigned QoS level of the transaction and the sideband signal is not asserted at a higher QoS level (conditional block 134, "no" leg), then the assigned QoS level of the transaction may remain the same (block 136). If there is a non-zero counter for a QoS level above the assigned QoS level of the transaction or if there is a received sideband signal at a higher QoS level (conditional block 134, "yes" leg), then the QoS level of the transaction may be upgraded to the QoS level of the highest non-zero counter or the sideband signal, whichever is highest (block 138). For example, in one scenario, using the QoS levels shown in tables 80 and 82 in FIG. 3, if the current QoS level of the transaction is green, if the highest non-zero counter is the yellow QoS level counter, and if the sideband signal is red, then the transaction may be upgraded to red.

Next, the transaction may be read out of the queue (block 140). Also, the counter corresponding to the original QoS level assigned to the transaction when it was enqueued may be decremented (block 142). For example, if a transaction had a QoS level of yellow upon entering the queue, and then the QoS level of the transaction was upgraded to red, the yellow counter may be decremented and the red counter may remain the same. After block 142, method 130 may end.

Figure 8:
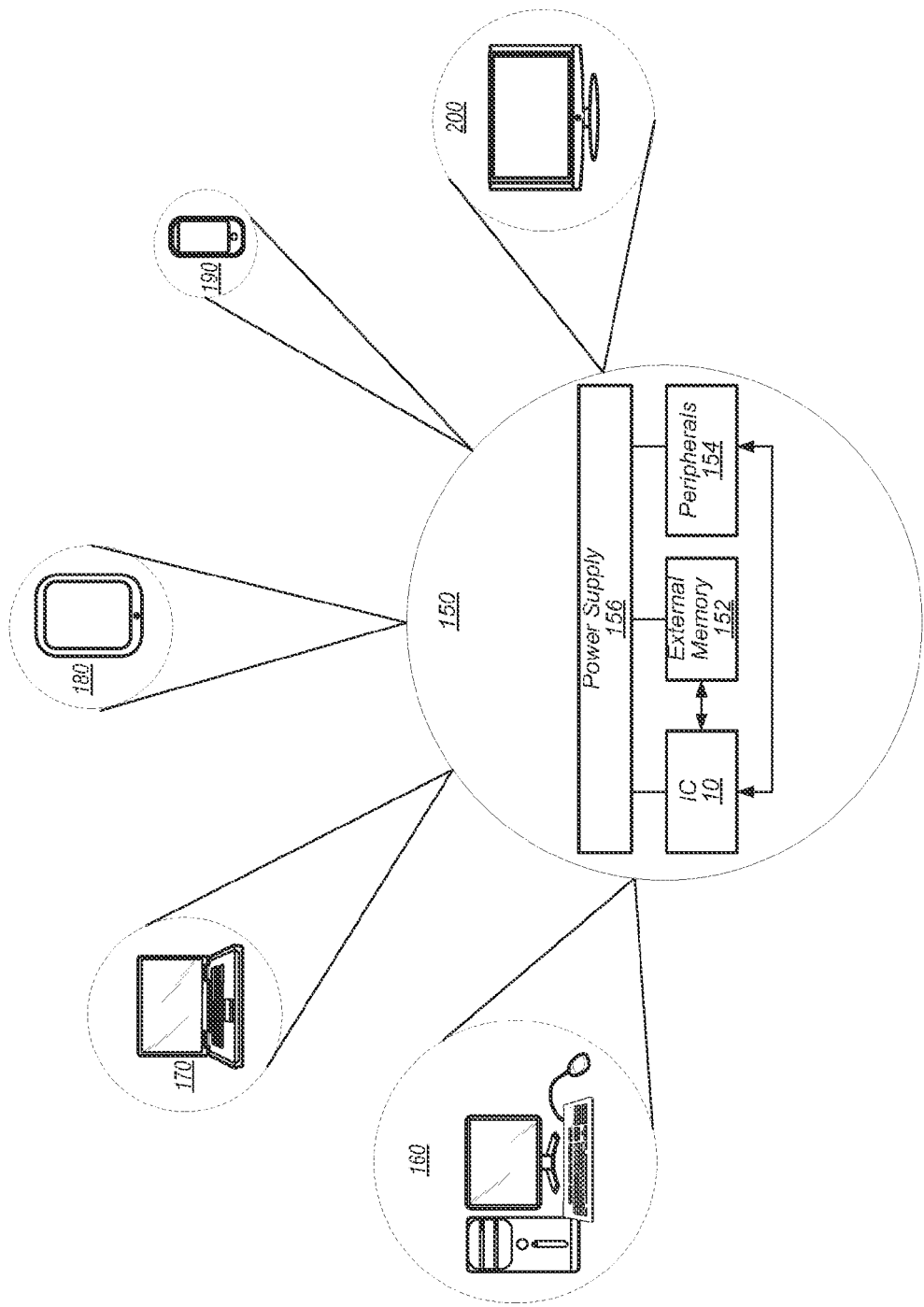
FIG. 8 is a block diagram of one embodiment of a system.

Turning now to FIG. 8, a block diagram of one embodiment of a system 150 is shown. As shown, system 150 may represent chip, circuitry, components, etc., of a desktop computer 160, laptop computer 170, tablet computer 180, cell phone 190, television 200 (or set top box configured to be coupled to a television), or otherwise. In the illustrated embodiment, the system 150 includes at least one instance of IC 10 (of FIG. 1) coupled to an external memory 152.

IC 10 is coupled to one or more peripherals 154 and the external memory 152. A power supply 156 is also provided which supplies the supply voltages to IC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of IC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multichip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc.

Figure 9:
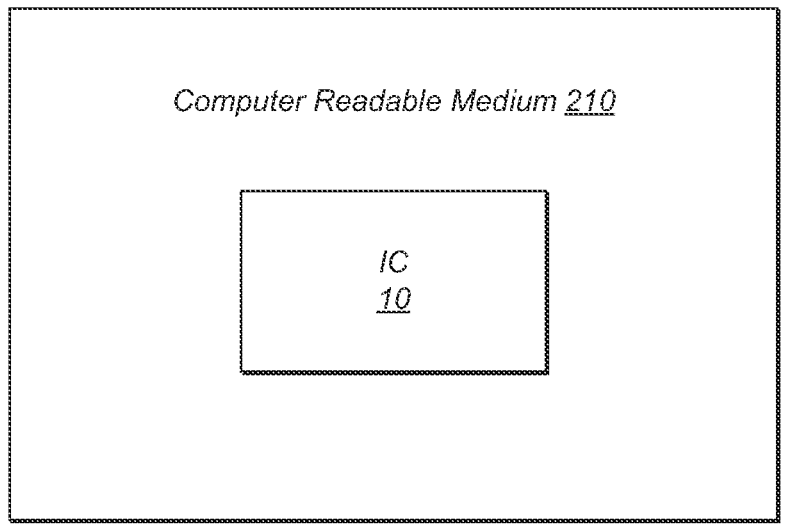
FIG. 9 is a block diagram of one embodiment of a computer readable medium.

Referring now to FIG. 9, one embodiment of a block diagram of a computer readable medium 210 including one or more data structures representative of the circuitry included in IC 10 (of FIG. 1) is shown. Generally speaking, computer readable medium 210 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 210 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 210 may be the netlist(s) (with or without the synthesis library) or the data set(s), as desired. In yet another alternative, the data structures may comprise the output of a schematic program, or netlist(s) or data set(s) derived therefrom. While computer readable medium 210 includes a representation of IC 10, other embodiments may include a representation of any portion or combination of portions of IC 10 (e.g., link interface unit 22).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A link interface unit comprising:
   a queue, wherein the queue is configured to store a plurality of transactions; and
   control logic, wherein the control logic is coupled to the queue, and wherein the control logic is configured to:
   maintain a first counter to track a number of transactions with a first quality of service (QoS) level that are stored in the queue; and
   upgrade a QoS level of a given transaction to the first QoS level responsive to:
   reading the given transaction out of the queue, wherein the given transaction has a QoS level lower than the first QoS level; and
   determining a value of the first counter is non-zero.

2. The link interface unit as recited in claim 1, wherein the first QoS level is a highest possible QoS level.

3. The link interface unit as recited in claim 2, wherein the control logic is further configured to:
   increment the first counter responsive to receiving a transaction with the first QoS level at the queue; and
   decrement the first counter responsive to reading a transaction with an original QoS level equal to the first QoS level out of the queue.

4. The link interface unit as recited in claim 3, wherein the control logic is further configured to:
   maintain a second counter to track a number of transactions with a second QoS level that are stored in the queue, wherein the second QoS level is below the first QoS level; and
   upgrade a QoS level of a given transaction to the second QoS level responsive to:
   reading the given transaction out of the queue, wherein the given transaction has a QoS level lower than the second QoS level;
   determining a value of the second counter is non-zero; and
   determining a value of the first counter is zero.

5. The link interface unit as recited in claim 2, wherein the link interface unit comprises a transmit unit and a receive unit, wherein the queue and the control logic are located in the receive unit, and wherein the receive unit is configured to forward the given transaction to a given agent after upgrading the QoS level of the given transaction to the first QoS level.

6. The link interface unit as recited in claim 1, wherein the control logic is further configured to upgrade the QoS level of the given transaction to the first QoS level responsive to receiving a sideband signal set to the first QoS level.

7. A method comprising:
   selecting a first transaction for transmission out of a queue;
   detecting an indication that there are one or more younger transactions in the queue that have a higher QoS level than the first transaction;
   upgrading a quality of service (QoS) level of the first transaction responsive to detecting said indication; and reading the first transaction out of the queue with the upgraded QoS level.

8. The method as recited in claim 7, wherein transactions may be assigned any of a plurality of QoS levels.

9. The method as recited in claim 8, wherein the plurality of QoS levels include green, yellow, and red.

10. The method as recited in claim 8, further comprising maintaining a counter for each upper-level QoS level, and wherein detecting said indication comprises checking if any counters corresponding to the upper-level QoS levels have a non-zero value.

11. The method as recited in claim 10, further comprising incrementing a counter corresponding to a first upper-level QoS level responsive to receiving a given transaction at the queue, wherein the given transaction is assigned the first upper-level QoS level.

12. The method as recited in claim 11, further comprising decrementing the counter corresponding to the first upper-level QoS level responsive to reading the given transaction out of the queue.

13. A method comprising:
  maintaining a plurality of counters to track a number of transactions in a queue at each quality of service (QoS) level of a plurality of QoS levels;
  selecting a given transaction in the queue for de-queuing, the given transaction having a first QoS level;
  identifying one or more of said counters with a non-zero value that correspond to QoS levels higher than the first QoS level; and
  upgrading a QoS level of the given transaction to a highest QoS level that corresponds to the one or more counters.

14. The method as recited in claim 13, further comprising incrementing a given counter responsive to receiving a transaction with a corresponding QoS level at the queue.

15. The method as recited in claim 14, further comprising decrementing the given counter responsive to reading a transaction with an original QoS level equal to the corresponding QoS level out of the queue.

16. The method as recited in claim 15, wherein the queue is located in a receive unit of a first link interface unit.

17. The method as recited in claim 16, wherein the transaction received by the receive unit of the first link interface unit is sent from a transmit unit of a second link interface unit.

18. The method as recited in claim 13, further comprising:
  receiving a first transaction with a first QoS level at the queue;
  incrementing a first counter corresponding to the first QoS level;
  reading the first transaction out of the queue;
  upgrading the first transaction to a second QoS level responsive to determining a second counter corresponding to the second QoS level is non-zero; and
  decrementing the first counter.

19. The method as recited in claim 18, wherein the second QoS level is higher than the first QoS level, and wherein the second counter corresponds to a highest QoS level with a non-zero counter.

20. An apparatus comprising:
  a queue, wherein the queue is configured to store a plurality of transactions;
  one or more counters, wherein each counter is configured to track a number of transactions in the queue at a corresponding quality of service (QoS) level; and
  wherein the apparatus is configured to upgrade a QoS level of a given transaction selected for dequeueing responsive to determining a younger transaction enqueued in the queue has a higher QoS level.

21. The apparatus as recited in claim 20, wherein each transaction is assigned a QoS level.

22. The apparatus as recited in claim 21, wherein the apparatus is further configured to upgrade a QoS level of a first transaction to a first QoS level responsive to determining the first QoS level is a highest QoS level with a non-zero counter.

23. The apparatus as recited in claim 22, wherein a sideband signal is set to a QoS level lower than the first QoS level.

24. The apparatus as recited in claim 22, wherein a first counter corresponding to the first QoS level remains the same and wherein a second counter corresponding to the QoS level of the first transaction is decremented when the first transaction is read out of the queue.

* * * * *